United States Patent
Capela Moraes et al.

(10) Patent No.: US 11,603,722 B2
(45) Date of Patent: Mar. 14, 2023

(54) SYSTEM FOR COLLECTING SOLID PARTICLES ACCUMULATING AT THE BOTTOM OF A SUBSEA OIL/WATER SEPARATION STATION

(71) Applicant: SAIPEM S.A., Montigny le Bretonneux (FR)

(72) Inventors: Carlos Alberto Capela Moraes, Saint-Cloud (FR); Sadia Banini Shaiek, Courbevoie (FR)

(73) Assignee: SAIPEM S.A., Montigny le (FR)

( * ) Notice: Subject to any disclaimer, the term of this patent is extended or adjusted under 35 U.S.C. 154(b) by 172 days.

(21) Appl. No.: 17/012,376

(22) Filed: Sep. 4, 2020

(65) Prior Publication Data

US 2021/0071488 A1 Mar. 11, 2021

(30) Foreign Application Priority Data

Sep. 6, 2019 (FR) ........................................ 1909829

(51) Int. Cl.
*E21B 21/00* (2006.01)
*E21B 21/06* (2006.01)
*E21B 21/08* (2006.01)
*E21B 43/36* (2006.01)

(52) U.S. Cl.
CPC .......... *E21B 21/065* (2013.01); *E21B 21/001* (2013.01); *E21B 43/36* (2013.01); *E21B 21/08* (2013.01)

(58) Field of Classification Search
CPC ...... E21B 21/001; E21B 21/065; E21B 21/08; E21B 43/36
See application file for complete search history.

(56) References Cited

U.S. PATENT DOCUMENTS

| 4,673,500 | A | * | 6/1987 | Hoofnagle | ............... E21B 43/34 210/DIG. 5 |
| 6,119,779 | A | * | 9/2000 | Gipson | ................... E21B 43/40 166/267 |
| 8,454,843 | B2 | * | 6/2013 | Brown | ............... B01D 21/2405 166/267 |
| 9,359,878 | B2 | | 6/2016 | Whitney et al. | |

(Continued)

FOREIGN PATENT DOCUMENTS

| WO | 9935370 A1 | 7/1999 |
| WO | 2019081949 A1 | 5/2019 |
| WO | WO-2020256565 A1 * | 12/2020 ............. B01D 12/00 |

OTHER PUBLICATIONS

Search Report from corresponding FR Application No. FR1909829, dated Apr. 22, 2020.

*Primary Examiner* — Matthew R Buck
(74) *Attorney, Agent, or Firm* — Workman Nydegger

(57) ABSTRACT

A system for collecting solid particles accumulating at the bottom of a subsea oil/water separation station of an installation for the subsea disposal of water produced during the deepwater subsea production of hydrocarbons, comprises at least one vertical drainage channel intended to open into a lower part of a horizontal body (of the oil/water separation station, a discharge pipe to be positioned horizontally under the horizontal body of the oil/water separation station and into which the drainage channel opens, and a high-pressure slurry ejector having a suction port connected to the discharge pipe via a supply valve.

11 Claims, 2 Drawing Sheets

(56) References Cited

U.S. PATENT DOCUMENTS

| | | | |
|---|---|---|---|
| 9,638,375 B2* | 5/2017 | Hollingsæter | E21B 43/36 |
| 2011/0139625 A1* | 6/2011 | Arntzen | B01D 19/0036 |
| | | | 204/662 |
| 2015/0306520 A1 | 10/2015 | Grave et al. | |

* cited by examiner

SYSTEM FOR COLLECTING SOLID PARTICLES ACCUMULATING AT THE BOTTOM OF A SUBSEA OIL/WATER SEPARATION STATION

BACKGROUND

Technical Field

The present invention relates to the general field of deepwater subsea production of hydrocarbons, in particular oil and gas. It relates more specifically to the removal of solid particles that accumulate during the removal of water produced during such subsea production of hydrocarbons.

Prior Art

In current deepwater subsea hydrocarbon production configurations, the generally preferred configuration is the connection of subsea production wells, either directly or via a subsea collector, to a floating production installation.

This installation generally consists of a floating production, storage and offloading (FPSO) unit to a tanker that regularly berths at a fixed location on the sea surface near the subsea production field to collect the oil produced.

The FPSO, with primary production facilities on its deck, typically carries out the separation and treatment of production fluids (gas, oil and produced water). For the latter fluid, the conventional surface treatment installation is composed of de-oiling hydrocyclones, possibly supplemented by a degassing and/or flotation unit to allow it to be drained at sea with a reduced oil content (usually less than 30 ppm).

It is also known to turn to subsea systems for separating and treating produced water from hydrocarbon producing fields, particularly at deep water depths and for high produced water contents, with produced water generally being injected into a rocky reservoir.

Indeed, as opposed to a surface produced-water treatment configuration, this subsea configuration can significantly increase oil production due to the reduction of pressure at the wellhead by removing the water column in the riser to the floating production unit (the FPSO).

The reduction in wellhead pressure through subsea water removal can be significant and is greater for deeper water depths and higher water contents of the produced oil. This condition of increasing the water content of produced oil is very common in most oil producing fields, particularly during the latter part of the operating life when the aquifer tends to reach the producing wells.

However, by allowing increased production due to reduced pressure at the wellhead (resulting in higher withdrawal pressure at the bottom) during the second half of the life of oil field production, when the water content of the oil exceeds 50%, the total flow (produced water and oil) from the wells increases and the drag forces around the well also increase, which can also result in increased production of fine and solid particles from the formation (sand, silt, clay, etc. —hereafter referred to as sand).

In practice, the flow from the production wells passes through a continuously operating multiphase cyclonic desander (preferably with a ceramic lining) that removes most of the sand load, even in the event of a sudden increase in sand, on a continuous basis. The low-pressure flow of slurry from the multiphase desander is "pumped" through a slurry ejector (having an internal ceramic coating to increase erosion resistance), which is driven by a high-pressure water motor flow.

Any sudden increase in sand production can be handled by this multiphase desander. In addition, a more permanent increase in sand loading, due for example to sand retention problems in one of the producing wells to a long ratio subsea oil/water separation station, can be compensated to some extent by forcing an increase in the flow rate of the slurry to be discharged, by increasing the flow rate of high pressure water to be discharged through an increased opening of the control valve.

The hydrocarbon, water and gas effluents from the multiphase desander—without most of the sand loads, which are removed by this device—are conveyed to a subsea oil/water separation station, for example to a modular liquid/liquid gravity separation device consisting of a plurality of pipes forming parallel loops (called coils) that can be installed on the seabed (separator called "SpoolSep" by the Applicant).

Some of the residual solid particles, which have not been removed by the multi-phase desander and continue to move with the liquid, may eventually settle inside the pipes of the subsea oil/water separation station, due to the low fluid velocity inside this equipment, which is required for good water-oil separation.

The amount of sand likely to settle inside the pipes will likely be very small and will likely be made up of very small particles, as the upstream multi-phase desander will remove most of the sand load and the larger particles. However, the oil/water separation station is expected to operate for several years during the operation on the seabed, and even small amounts of tiny solid particles can form a significant layer at the bottom of the pipes if not removed periodically.

To solve this problem, it is known to turn to systems to collect the sand accumulated at the bottom of the pipes of the oil/water separation station. It is possible, for example, to refer to U.S. Pat. No. 9,359,878 which describes the use of sand traps that are placed all along the pipes of the oil/water separation station to periodically collect the sand accumulated at the bottom of these pipes. However, the collection system described in this document has several drawbacks, including the use of multiple sand traps and associated centrifugal discharge devices, and is relatively complex to implement.

SUMMARY

The main purpose of the invention is therefore to propose a system for collecting solid particles accumulating at the bottom of an underwater oil/water separation station which does not have the above-mentioned disadvantages.

In accordance with the invention, this is achieved by means of a system for collecting solid particles accumulating at the bottom of a subsea oil/water separation station of an installation for the subsea disposal of water produced during the deepwater subsea production of hydrocarbons, comprising at least one vertical drainage channel intended to open into a lower part of a horizontal body of the oil/water separation station, a discharge pipe to be positioned horizontally under said horizontal body of the oil/water separation station and into which the drainage channel opens, and a high-pressure slurry ejector having a suction port connected to the discharge pipe via a supply valve.

The collection system according to the invention is remarkable in that it has a passive network of piping connected to a high-pressure slurry ejector, which allows the continuous and periodic removal of the sand accumulated at the bottom of the oil/water separation station body. In particular, the collection system according to the invention is of simplified design and maintenance and is highly reliable, particularly safe from failures. In addition, the collection system according to the invention allows each pipe of the oil/water separation station body to be cleaned independently by removing accumulated deposits, thus avoiding rendering the oil/water separation station totally inoperative during this cleaning.

In addition, this suction discharge configuration via a dedicated slurry ejector increases the flexibility of the collection system with respect to the discharge flow rate (by activating the motor flow), further enhancing the flexibility of this continuous sand removal configuration in the event of abnormal sand production from the wells.

Even if residual sand is deposited inside the body of the oil/water separation station, the regular operation of the collection system according to the invention will guarantee a proper management of the sand bed possibly formed inside the oil/water separation station. This collection system, without moving parts or internal components, is extremely reliable and, if operating correctly, it must be used periodically to avoid high-concentration muds. Moreover, the only valve used to allow this operation is remotely operated from the FPSO. The frequency of operation is low (usually once a week or even less), which is not a problem. Moreover, a connection of the flushing pipe upstream of this valve can avoid the presence of sand near the valve just before it closes after a flushing operation.

The body of the subsea oil/water separation station may be cylindrical and comprise in its lower part a plurality of holes longitudinally spaced from each other and each opening into a drainage channel. In this case, the holes formed in the lower part of the body of the subsea oil/water separation station are preferably aligned along a longitudinal axis tangential to the cylindrical shape of the body.

In another embodiment, the body of the subsea oil/water separation station is cylindrical and comprises in its lower part a continuous longitudinal slit opening into a drainage channel formed by two parallel plates. In this case, the drainage channel advantageously comprises a plurality of spacers connecting the two plates together in order to rigidify the body of the subsea station and the drainage channel.

Preferably, the discharge pipe has a larger diameter than the diameter of the drainage channel.

The suction port of the slurry ejector can be connected to a longitudinal end downstream of the discharge pipe.

Preferably also, the discharge pipe is connected at one longitudinal end to a high-pressure water line to allow flushing of the discharge pipe with water.

The invention also relates to an installation for the subsea disposal of produced water during the deepwater subsea production of hydrocarbons, comprising a desander fed continuously with fluids coming directly from at least one hydrocarbon production well, a subsea oil/water separation station fed with fluids coming from the desander, and a system for collecting solid particles accumulating at the bottom of the oil/water separation station as previously defined.

Preferably, the oil/water separation station is a modular liquid/liquid gravity separation device whose body is made up of a plurality of pipes forming parallel loops, the solid particle collection system comprising a discharge pipe positioned horizontally under each pipe of the body of the oil/water separation station and a high-pressure slurry ejector common to all the discharge pipes.

The invention further relates to a process for controlling the installation as defined above, in which the desander, the oil/water separation station, and the solid particle collection system are put into continuous operation, the feed valve of the high-pressure slurry ejector being periodically opened to allow cleaning of solid particle deposits in the discharge pipe of the solid particle collection system.

DETAILED DESCRIPTION OF VARIOUS EMBODIMENTS

The invention applies to the subsea production and processing of hydrocarbons, in particular oil and gas, at great depths (i.e. greater than 700 meters) from oil fields that have an increasing increase in the production of water content. More specifically, it concerns the collection (or disposal) of solid particles accumulated in the oil/water separation station of the subsea produced-water disposal installation.

Increasing the water content of produced oil has become very common in most oil producing fields, particularly during the latter part of the operating life when the aquifer tends to reach the producing wells.

Figure 1:
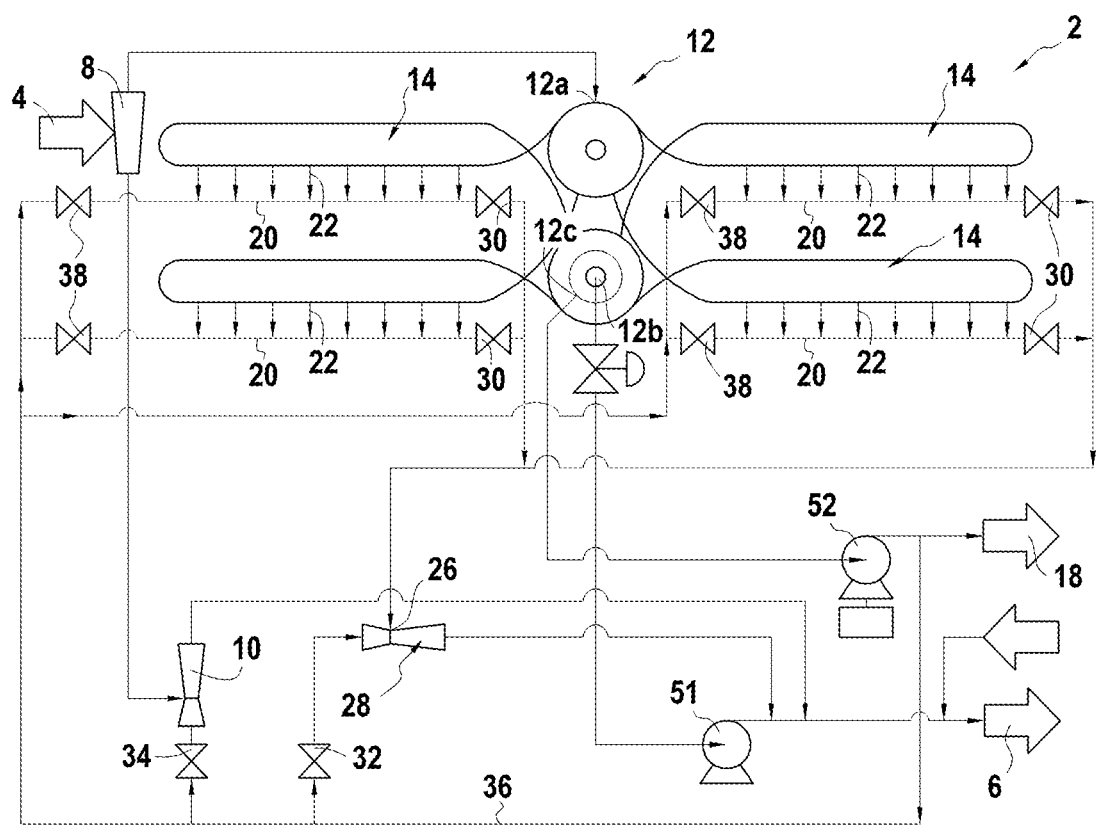
FIG. 1 is a schematic and partial representation of an installation for the underwater disposal of water produced according to an embodiment of the invention.

FIG. 1 shows an example of a deepwater subsea oil production facility 2 from an oil production field 4.

Typically, a deep offshore oil production field is operated at water depths between 1000 m and 3000 m. It consists of a plurality of hydrocarbon production wells designed to collect oil and gas from an oil reservoir in the reservoir rock.

The extracted hydrocarbons are typically sent to a production unit 6 on the surface, such as a floating production, storage and offloading (FPSO) unit, through subsea pipelines and risers (not shown).

Before being transported back to the production unit 6, the hydrocarbons extracted from the oil reservoir are treated at seafloor level in order to, among other things, separate the produced oil from the water contained therein and to remove fine and solid particles from the reservoir rock (sand, silt, clay, etc. —hereafter referred to as sand).

To this end, the subsea hydrocarbon production facility 2 includes in particular a desander 8 which is fed with fluids from the hydrocarbon production wells 4. For example, the desander is a multiphase cyclonic desander (preferably with a ceramic lining) which operates continuously to remove most of the sand load, even in the event of a sudden increase in sand.

The low-pressure flow of slurry from the desander 8 is continuously sucked in by a slurry ejector 10 (preferably with an internal ceramic lining to increase erosion resistance), which is driven by a high-pressure water motor flow controlled by the supply valve (on/off) 34. The slurry flow is then sent to the production unit 6 for treatment.

The hydrocarbon, water and gas effluents from the desander 8 (without most of the sand loads, which are disposed of by this device) are conveyed to a subsea oil/water separation station 12.

Different types of subsea oil/water separation stations can be used. In particular, in the example shown in FIG. 1, a modular liquid/liquid gravity separation device may be used, the body of which is made up of a plurality of cylindrical pipes without internal elements and forming parallel loops (called coils, four in the example shown in FIG. 1) which may be installed on the seabed because their reduced diameter provides a high resistance to external/internal differential pressure.

An example of such a modular liquid/liquid gravity separation device (called "SpoolSep") is described in publication WO 2011/161343 on behalf of the Applicant. The high length and circular cross-section of the pipes of this separation device allow a high differential pressure resistance to be achieved in a relatively lightweight configuration. In addition, its modular configuration allows flexible installation conditions even for high capacity systems (high inlet flow rate). Thus, this device allows primary separation of bulk raw water at any desired pressure, especially at low pressure, independent of the surrounding pressure (water depth).

As shown in FIG. 1, this subsea oil/water separation station 12 also comprises a hydrocarbon inlet 12a, an oil and gas outlet 12b which is connected to the production unit 6 on the surface via a riser by means of a pump 51, and a water outlet 12c which is intended, for example, to be connected via a high-pressure pump 52 to a preferably flat oil/water gravity separation tank 18 lying on the seabed.

Some of the residual solid particles that have not been removed by the desander 8 and that continue to move with the liquid, may eventually settle inside the pipes, due to the low fluid velocity inside this equipment, which is required for good water-oil separation.

To this end, in accordance with the invention, it is provided to install a system for collecting the solid particles accumulating at the bottom of the oil/water separation station.

More precisely, a discharge pipe 20 is positioned horizontally under the body of the oil/water separation station 12. In the example of an oil/water separation station of the type shown in FIG. 1, a discharge pipe 20 is positioned under each pipe 14 forming the parallel loops.

For each discharge pipe 20, the collection system according to the invention also comprises a plurality of vertical drainage channels 22 which are each intended to open into a lower part of the pipes 14 of the oil/water separation station and to open into the discharge pipe.

Figure 2:
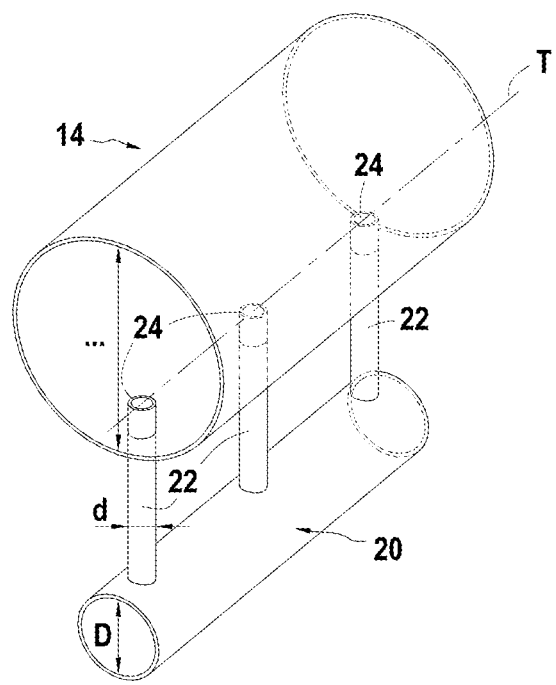
FIG. 2 is a view of a collection system fitted to the installation in FIG. 1.

As shown more precisely in FIG. 2, the lower longitudinal axis T which is tangent to the cylindrical body of the pipes 14 of the oil/water separation station has a plurality of holes 24 which are longitudinally spaced from each other and each of which opens into a drainage channel 22.

The drainage channels 22 (and the holes 24) have a diameter d which depends on the diameter of the pipe 14 of the oil/water separation station, and is sized to drain the slurry at low velocity. Typically, this diameter d is of the order of about 2 to 8 mm.

The drainage channels 22 are devoid of internal elements and vortex breakers on the top, i.e. small diameter vertical pieces of pipe, opening at the bottom of the pipes 14. This configuration is intended to avoid any devices that could be clogged by slurry.

The distance between the holes 24 at the bottom of the, pipes 14 of the oil/water separation station, i.e. the distance between two consecutive drainage channels 22, is variable and calculated (by fluid dynamic analysis software) according to the actual conditions of a particular scenario in order to limit the maximum height of the sand layer at the bottom of the pipe. Typically, this distance is about 1 m.

Each drainage channel 22 leaving the pipe 14 of the oil/water separation station goes down into the same horizontal discharge pipe 20 (having a diameter D larger than that of the drainage channels—usually about 5 to 10 cm in diameter).

In addition, as shown in FIG. 1, the downstream end of each horizontal discharge pipe 20 is connected to the suction port 26 of a high-pressure slurry ejector 28 via a supply valve 30 (on/off type).

In order to facilitate the periodic cleaning of sand deposits at the bottom of the pipes 14 of the oil/water separation station, each of them may have a corresponding supply valve 30 open at a time and the slurry at the bottom of this pipe is sucked in through several vertical drainage channels 22 connected to the corresponding discharge pipe 20.

The suction speed is controlled by injecting water at high pressure into the slurry ejector 28 via the setting of the opening of a modulating control valve 32 (or by setting a stepwise adjustable throttle). This operation allows part of the liquid to be sucked out of the pipe 14 of the oil/water separation station in a controlled manner to avoid the formation of drainage vortices inside the pipe so as not to disturb its operation.

This removal of water from the bottom of the pipes of the oil/water separation station will carry solid particles (sand, silt, etc.) that will eventually settle to the bottom of the discharge pipes. Even if a small amount of solid particles remains at the bottom of the pipes after the suction operation, between two neighboring holes 24 at the bottom of the pipe, the height of this layer of sand is limited because the next suction period will cause the particles from above to fall out, which will be replaced by new ones.

This repeated process prevents any possible compaction of the particle layer by periodically forcing its release through the vertical drainage channels. No increase in the residual sand layer is expected, as the fluid dynamics inside the body of the oil/water separation station during flushing is designed to avoid this phenomenon, according to an appropriate design of the collection system.

The diameter d of the vertical drainage channels 22 can optionally vary according to its distance from the slurry ejector 28. This optimized configuration can be determined during the design, taking into account specific scenario data, and will be established in order to obtain an appropriate suction through the different vertical drainage channels.

Alternatively, a study using fluid dynamic analysis software can show that, for a specific scenario (data on the particle size distribution of solid particles), solid particles with a selective distribution size can only be deposited at a certain length from the inlet of the pipes of the oil/water separation station (with the largest solid particles remaining near the inlet). This is likely in a widely dispersed size distribution. In this case, the collection system according to the invention can be provided with a non-uniform discharge pipe diameter configuration, in order to optimize sand removal along the length of the pipes of the oil/water separation station.

Furthermore, a connection of the high-pressure water line 36 (used to feed the high-pressure slurry ejector 28, see FIG. 1) can also be connected (via a valve 38) to each of the upstream ends of the horizontal discharge pipes 20 of the collection system or immediately upstream of the corresponding supply valve 30, in order to allow flushing of the discharge pipes. This has the advantage of a high degree of operating flexibility in the event of system malfunctions or to avoid residual solid particles in the bore of the supply valve.

This high-pressure water flushing could be carried out during the final suction procedure from the bottom of the pipes of the oil/water separation station, in order to avoid sand accumulation upstream of the corresponding supply valve 30. It should be noted that when flushing with high-pressure water, an increase in water flow is provided inside the horizontal discharge pipe during the flushing procedure, thus facilitating the drainage of the slurry. In normal operation, the expected deposited sand layer is very small and the pipe flushing procedure should be frequent enough to generate only low concentration slurry and avoid any increase in height and compaction of the deposited layer, so that no blockage of the flushing pipe network is possible if such a system operation is carried out.

Figure 3:
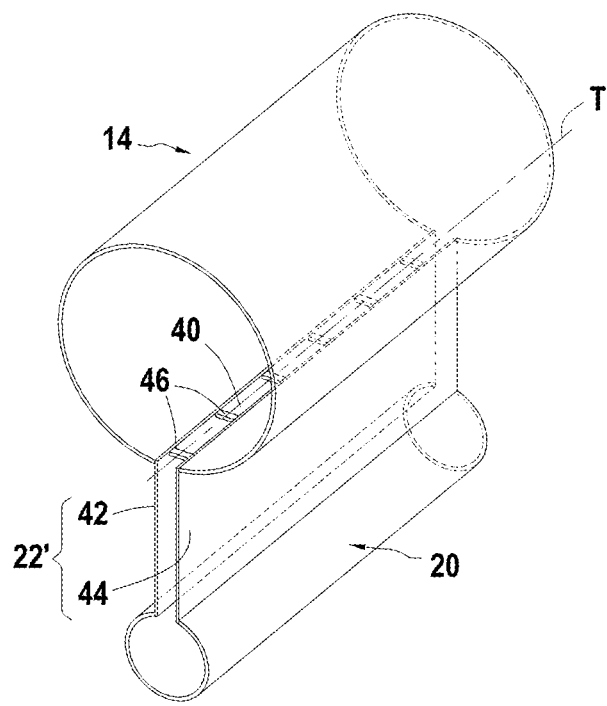
FIG. 3 shows a collection system according to another embodiment of the invention.

FIG. 3 represents another embodiment of the collection system according to the invention.

This embodiment differs from the one described above, in particular in that each pipe 14 of the oil/water separation station has a continuous longitudinal slot 40 in its lower part, which opens into a vertical drainage channel 22' formed by two parallel plates 42, 44, this drainage channel opening into a suction line 20.

With this embodiment, it is practically impossible to have a growing sand layer at the bottom of the oil/water separation station body.

Furthermore, in order to stiffen the drainage channel 22' and thus reduce the thickness of the plates 42, 44, the drainage channel comprises a plurality of spacers 46 connecting the two plates together.

The procedure for collecting the solid particles must be repeated for each of the pipes of the oil/water separation station in order. The duration of this operation, as well as its frequency, will be operationally determined according to the amount of solid particles present at the bottom of the pipes, which should be very low due to the desander 8 operating continuously upstream, as already explained.

The determination of the quantity of solid particles can be carried out using a monitoring system (sonar type, for example) or a sand bed monitoring system or directly evaluated by the operator by aligning the product flow from the subsea system to a separation test station located on the FPSO (for flushing time) to allow the evaluation of the quantity of solid particles. Once the frequency of the operation is determined, it can be automated via the main control system. In this case, acoustic solid particle detectors should be installed in the collection system to provide immediate information in the event of certain sudden arrivals of solid particles (for example accidental sand production). Based on this information, the operating team could review the required frequency of flushing operations to optimize the operation of the collection system.

It should be noted that even if residual sand is deposited inside the pipes of the oil/water separation station, the regular operation of the collection system according to the invention will ensure proper management of the sand bed eventually formed inside the pipes.

This collection system, with no moving parts or internal components, is extremely reliable and, if operating correctly, is used periodically to avoid high concentration slurry. In addition, the only on-off valve (one per slurry discharge pipe) used for this operation is remotely operated from the FPSO. The frequency of operation is low (usually once a week or even less), which is not a problem; moreover, a connection of the collection system upstream of this valve can avoid the presence of sand near the valve just before it closes after a flushing operation.

The increased flexibility, reliability and robustness of the collection system according to the invention results from:

the ability to manage large, untimely sand inflows and a permanent increase in sand production due to a localized problem in one of the producing wells. The desander has this feature of handling sudden and large sand inflows and the ability to increase the discharge rate—by increasing the water flow from the suction ejector—which allows a permanent increase in sand loading to be handled.

Conduits with open pipes to gently remove the sand layer, through a stream of slurry diluted and continuously injected into a multi-phase pipeline (further diluted with production) using a dedicated slurry ejector—no moving parts or internal components required—virtually nothing breaks down.

Limited number of on/off supply valves required (one per coil of the oil/water separation station).

Ability to flush these feed valves after each operation (avoiding any sand residue immediately upstream/downstream of the valves).

No interruption of the normal separation inside the coils of the oil/water separation station, even during the periodic procedure of removing sand from the pipes.

Possibility to regulate the flow of excess produced water discharged by the sand evacuation procedure, modulating the time required for the suction procedure, thus minimizing the impact on surface production activities.

No slurry flow due to sand in active pumping systems, as the slurry ejectors are designed to send the slurry flows downstream of the multi-phase pump directly into the multi-phase pipeline.

Economical solution based solely on pipes, a reduced number of on/off supply valves and passive elements (sand ejectors with erosion-resistant ceramic core).

The invention claimed is:

1. A system for collecting solid particles accumulating at a bottom of a subsea oil/water separation station of a subsea disposal installation for water produced during deepwater subsea production of hydrocarbons, comprising:
   at least one vertical drainage channel intended to open into a lower part of a horizontal body of the oil/water separation station;
   a discharge pipe to be positioned horizontally under said horizontal body of the oil/water separation station and into which the drainage channel opens; and
   a high-pressure slurry ejector having a suction port connected to the discharge pipe via a supply valve;
   wherein the discharge pipe is connected at one longitudinal end to a high-pressure water line to allow flushing of the discharge pipe with water.

2. The system as claimed in claim 1, wherein the body of the subsea oil/water separation station is cylindrical and comprises in a lower part of the body a plurality of holes spaced longitudinally from one another and each opening into a drainage channel.

3. The system as claimed in claim 2, wherein the holes formed in the lower part of the body of the subsea oil/water separation station are aligned along a longitudinal axis tangent to the cylindrical shape of the body.

4. The system as claimed in claim 1, wherein the body of the subsea oil/water separation station is cylindrical and comprises in a lower part of the body a continuous longitudinal slot opening into a drainage channel formed by two parallel plates.

5. The system as claimed in claim 4, wherein the drainage channel comprises a plurality of spacers connecting the two plates together to stiffen the drainage channel.

6. The system as claimed in claim 1, wherein the discharge pipe has a diameter greater than the diameter of the drainage channel.

7. The system as claimed in claim 1, wherein the suction port of the slurry ejector is connected to a downstream longitudinal end of the discharge pipe.

8. An installation for the subsea disposal of water produced during deepwater subsea production of hydrocarbons, comprises:
   a desander continuously supplied with fluids coming directly from at least one hydrocarbon production well;
   a subsea oil/water separation station supplied with fluids from the desander; and
   a system for collecting solid particles accumulating at a bottom of the oil/water separation station as claimed in claim 1.

9. The installation as claimed in claim 8, wherein the oil/water separation station is a modular liquid/liquid gravity separation device a body of which is made up of a plurality of pipes forming parallel loops, the solid particle collection system comprising a discharge pipe positioned horizontally under each pipe of the body of the oil/water separation station and a high-pressure slurry ejector common to all the discharge pipes.

10. A process for controlling the installation as claimed in claim 8, wherein the desander, the oil/water separation station and the solid particle collection system are put into continuous operation, a feed valve of the high-pressure slurry ejector being periodically opened to allow cleaning of solid particle deposits in the discharge pipe of the solid particle collection system.

11. An installation for subsea disposal of water produced during deepwater subsea production of hydrocarbons, comprises:
   a desander continuously supplied with fluids coming directly from at least one hydrocarbon production well;
   a subsea oil/water separation station supplied with fluids from the desander; and
   a system for collecting solid particles accumulating at a bottom of the oil/water separation station, the system including:
      at least one vertical drainage channel intended to open into a lower part of a horizontal body of the oil/water separation station;
      a discharge pipe to be positioned horizontally under said horizontal body of the oil/water separation station and into which the drainage channel opens; and
      a high-pressure slurry ejector having a suction port connected to the discharge pipe via a supply valve;
   wherein the oil/water separation station is a modular liquid/liquid gravity separation device, a body of which is made up of a plurality of pipes forming parallel loops, the solid particle collection system comprising a discharge pipe positioned horizontally under each pipe of the body of the oil/water separation station and a high-pressure slurry ejector common to all the discharge pipes.

* * * * *